United States Patent
Ilardo et al.

(10) Patent No.: US 12,146,362 B2
(45) Date of Patent: Nov. 19, 2024

(54) SELF-LOCKING ELECTRONIC VEHICLE CHARGE PORT DOOR ASSEMBLY

(71) Applicant: Minebea AccessSolutions Italia S.p.A., Pianezza (IT)

(72) Inventors: Simone Ilardo, Pianezza (IT); Anthony Guerin, Pianezza (IT); Frederic Citron, Pianezza (IT); Sekinger Fabian, Pianezza (IT)

(73) Assignee: Minebea AccessSolutions Italia S.p.A., Pianezza (IT)

( * ) Notice: Subject to any disclaimer, the term of this patent is extended or adjusted under 35 U.S.C. 154(b) by 368 days.

(21) Appl. No.: 17/646,927

(22) Filed: Jan. 4, 2022

(65) Prior Publication Data
US 2022/0213728 A1   Jul. 7, 2022

(30) Foreign Application Priority Data

Jan. 6, 2021 (EP) .................................... 21150432

(51) Int. Cl.
| | | |
|---|---|---|
| *B60K 15/05* | (2006.01) | |
| *B60L 53/30* | (2019.01) | |
| *B62D 25/24* | (2006.01) | |
| *E05F 15/63* | (2015.01) | |

(52) U.S. Cl.
CPC .............. *E05F 15/63* (2015.01); *B60K 15/05* (2013.01); *B60L 53/30* (2019.02); *B62D 25/24* (2013.01); *E05Y 2201/434* (2013.01); *E05Y 2201/626* (2013.01); *E05Y 2900/534* (2013.01)

(58) Field of Classification Search
CPC ... B62D 25/24; E05F 15/63; E05Y 2201/626; E05Y 2201/624; E05Y 2201/628; E05Y 5/50; E05Y 2800/26; E05Y 2900/53; B60K 15/05; B60K 15/0507; B60K 15/053; B60K 15/0538; B60K 15/0546; B60K 15/0561; B60K 15/0576
USPC ........................................................ 296/97.22
See application file for complete search history.

(56) References Cited

FOREIGN PATENT DOCUMENTS

| DE | 20 2016 105 735 U1 | 10/2016 |
| DE | 10 2017 222 397 A1 | 6/2019 |

OTHER PUBLICATIONS

The extended European search report mailed Jun. 11, 2021 in corresponding European Patent Application No. 21150432.9, (7 pages).

*Primary Examiner* — Dennis H Pedder
(74) *Attorney, Agent, or Firm* — Oblon, McClelland, Maier & Neustadt, L.L.P.

(57) ABSTRACT

A vehicle charge port door assembly includes a charge port flap, a bracket to be fixed to the vehicle, a motorized actuation mechanism to move the charge port flap between a closed position and an open position, an actuator fixed to the bracket and including a rotatable output shaft with an eccentric crank pin, at least one lever parallelogram with a first and a second levers, hinged, at one end, to the charge port flap and at, the other end, to the bracket and able to drive the charge port flap between the open and closed position, and a driving rod connecting the crank pin to a driving protrusion of the first lever so that an eccentric movement of the crank pin drives, via the lever parallelogram, the charge port flap between the closed and the open position and vice versa.

12 Claims, 9 Drawing Sheets

SELF-LOCKING ELECTRONIC VEHICLE CHARGE PORT DOOR ASSEMBLY

The invention pertains to the domain of door assemblies for vehicles, and more particularly concerns a door assembly for the charge port of an electric vehicle.

BACKGROUND

The charge port for plug-in hybrid and electric vehicles usually is externally mounted, thereby allowing easy access to the user. In the same way as a fuel filler door or flap on a conventional vehicle protects the fuel port, a charge port door or charge port flap is used to protect the charge port from all weather conditions as well as unwanted access or tampering.

For premium electric or hybrid vehicles, the opening and closing charge port door is actuated by a electrical actuator mechanism that opens automatically and thus does not require the user to actuate nor manipulate the charge port door himself. It is sought that during the opening movement of the charge port door, the charge port door remains as close as possible from the outer surface of the vehicle skin and that at the very least, the charge port door protrudes as little as possible from the outer surface of the vehicle skin. Such arrangement is safer against accidental snatching of the charge port door. This is in particular important because for a fuel port, the flap is only opened for some minutes and the user or gas station attendee is standing near by the vehicle whereas at least at present, charging of a Phev (plug-in-hybrid-electrical vehicle) or an electrical vehicle may take some hours during which the charge port flap remains open.

A variety of mechanisms have been proposed to fulfil these conditions. For example, some charge port door assemblies provide a latch or spring mechanism that maintains the charge port door closed in such a way that it is pulled upon from the inside of the vehicle to ensure good sealing and/or to maintain the charge port door open in such a way that a user cannot actuate it to close the door. However, these solutions typically require a supplemental device that takes space within the inside of the port and/or a power supply.

A charge port door assembly is known from CN 211468585. It comprises a charge port flap, a bracket configured to be fixed to the vehicle and a motorized actuation mechanism configured to move the charge port flap between a closed position and an open position, such that in the closed position, the charge port flap closes a charge port of the vehicle and sits flush with an outer surface of the vehicle and that in the open position, access is granted to the charge port. To that end, it comprises levers hinged, at one end, to the charge port flap and, at the other end, to an actuator driving the levers. Due to this particular configuration, a fairly powerful—and thus large—actuator is required to drive levers attached to the charge port flap.

BRIEF SUMMARY

To overcome these drawbacks, the invention provides an electric vehicle charge port door assembly comprising:
- a charge port flap,
- a bracket configured to be fixed to the vehicle
- a motorized actuation mechanism configured to move the charge port flap between a closed position and an open position, such that in the closed position, the charge port flap closes a charge port of the vehicle and sits flush with an outer surface of the vehicle and that in the open position, access is granted to the charge port, characterized in that the motorized actuation mechanism comprises:
  - an actuator fixed to the bracket and comprising a rotatable output shaft with an eccentric crank pin,
  - at least one lever parallelogram with a first and a second levers, each lever being hinged, at one end, to the charge port flap and at, the other end, to the bracket and configured to drive the charge port flap between said open and closed position,
  - one of said first or second levers presenting, at its end hinged to the bracket a driving protrusion,
  - a driving rod connecting said crank pin to the driving protrusion so that an eccentric movement of the crank pin drives via the lever parallelogram the charge port flap between the closed and the open position and vice versa.

Thanks to the particular kinematic chain provided by the invention, the movement of the charge port door during its opening and closing movement remains as close as possible to the skin, i.e. achieves a movement that is mostly parallel to the outer vehicle skin. Moreover, the driving rod acts as a force multiplier allowing for a more compact actuating mechanism, thanks to the lesser forces required to open and close the charge port door.

Another concern for electric vehicles is to ensure a good sealing of the charge port door to prevent any liquid, such as rainwater, from entering the port, as well as ensuring that the charge port door sits flush with the outer surface of the vehicle for improved aesthetics and aerodynamics.

Therefore, in order to provide an electronic vehicle charge port assembly that ensures a good sealing of the charge port door in its closed position, for example, in a plane that is normal to the output shaft, the longitudinal axis along which the crank pin extends forms an angle with the longitudinal axis along which the driving rod extends, said angle being comprised between 1° and 3°, preferably 1.5°. This ensures a good sealing of the charge port door in its closed position.

Advantageously, the actuation mechanism is for example configured such that the open position corresponds to an end of stroke of the output shaft.

This prevents a user from manually opening or closing the charge port door. Indeed, thanks to the fact that the open position corresponds to an end of stroke of the output shaft and the particular kinematic chain provided by the invention, it is not possible to close the charge port flap by actuating the charge port flap directly. The mechanism is therefore self-locking in the open position, as the only way to close the flap is to actuate the output shaft by rotating it in the direction opposite the opening rotation direction.

According to a particular embodiment, the actuator is for example configured such that rotation of the output shaft is comprised between 3° and 185°.

According to a particular embodiment, the bracket is for example delimited by an upper bracket side and a lower bracket side that are substantially parallel, and the charge port flap is delimited by an upper flap side and a lower flap side that are substantially parallel.

According to a particular embodiment, the first and second levers are for example hinged, at one end, to the lower bracket side and, at the other end, to the upper flap side.

According to a particular embodiment of the invention, the bracket includes for example an opening intended to receive the charge port of the vehicle.

In order to prevent any friction in the actuation mechanism during the opening and closing of the charge port door, for example the end of the driving rod connected to the driving protrusion comprises a notch, preferably semi-circular in shape, in order for the driving rod to get around the first lever hinge when it rotates.

In order to prevent any friction in the actuation mechanism during the opening and closing of the charge port door, for example the first lever comprises two perpendicular rectilinear legs joined by a transverse section such that the space between the rectilinear legs allows to make way for the second lever when it rotates.

So as to prevent further opening of the charge door port after it has reached its open position, the first lever rests upon the second lever in the open position.

According to a particular embodiment of the invention, the second lever is for example J-shaped and the curved portion of the second lever comes into contact with the transverse section of the first lever in the open position.

BRIEF DESCRIPTION OF THE FIGURES

The invention will be better understood in view of the following description, referring to the annexed Figures in which.

DETAILED DESCRIPTION

Figure 1:
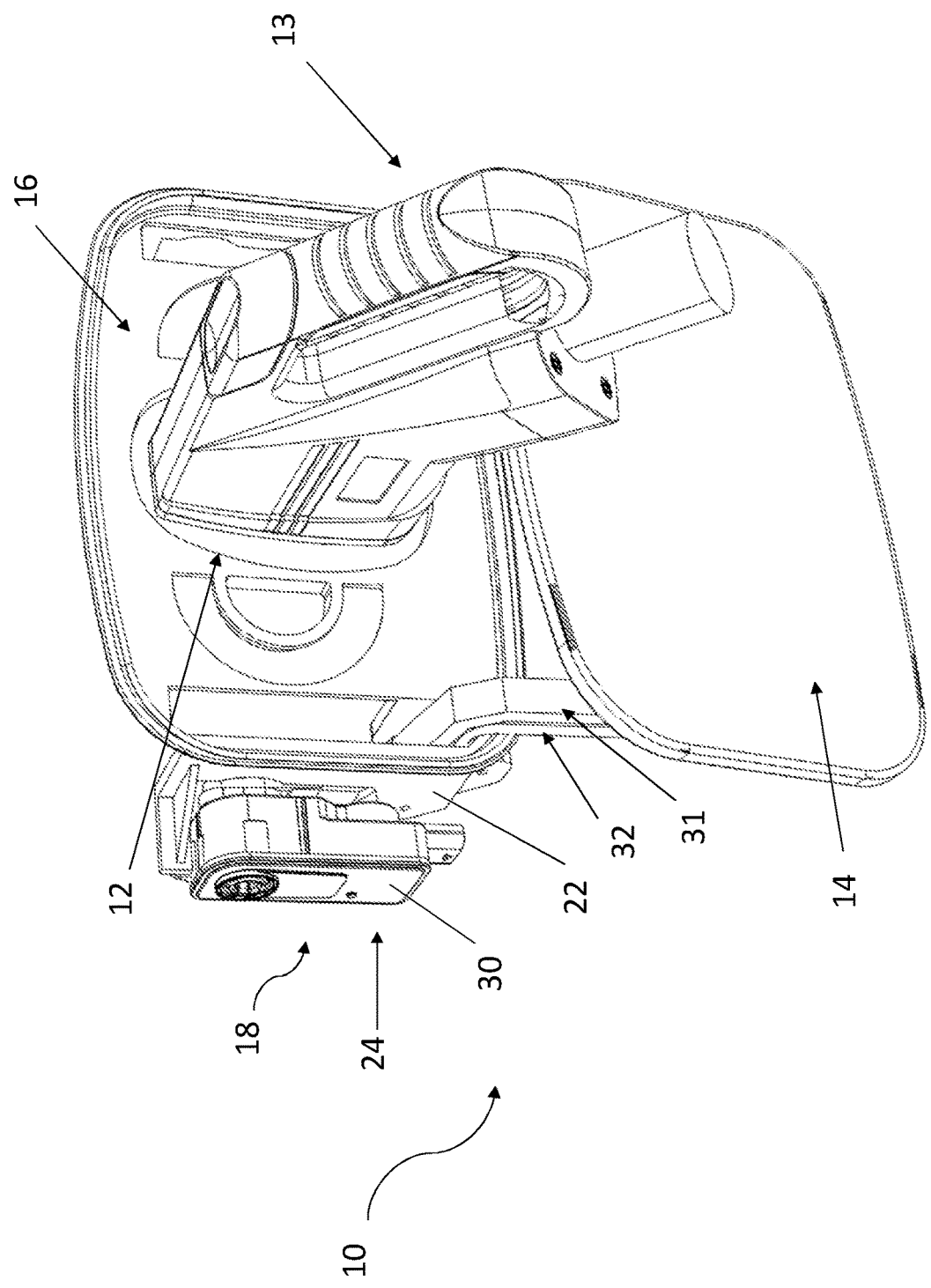
FIG. 1 is a view in perspective of a vehicle charge port door assembly according to a particular embodiment of the invention and a charge plug, the charge port flap being open.
Figure 2:
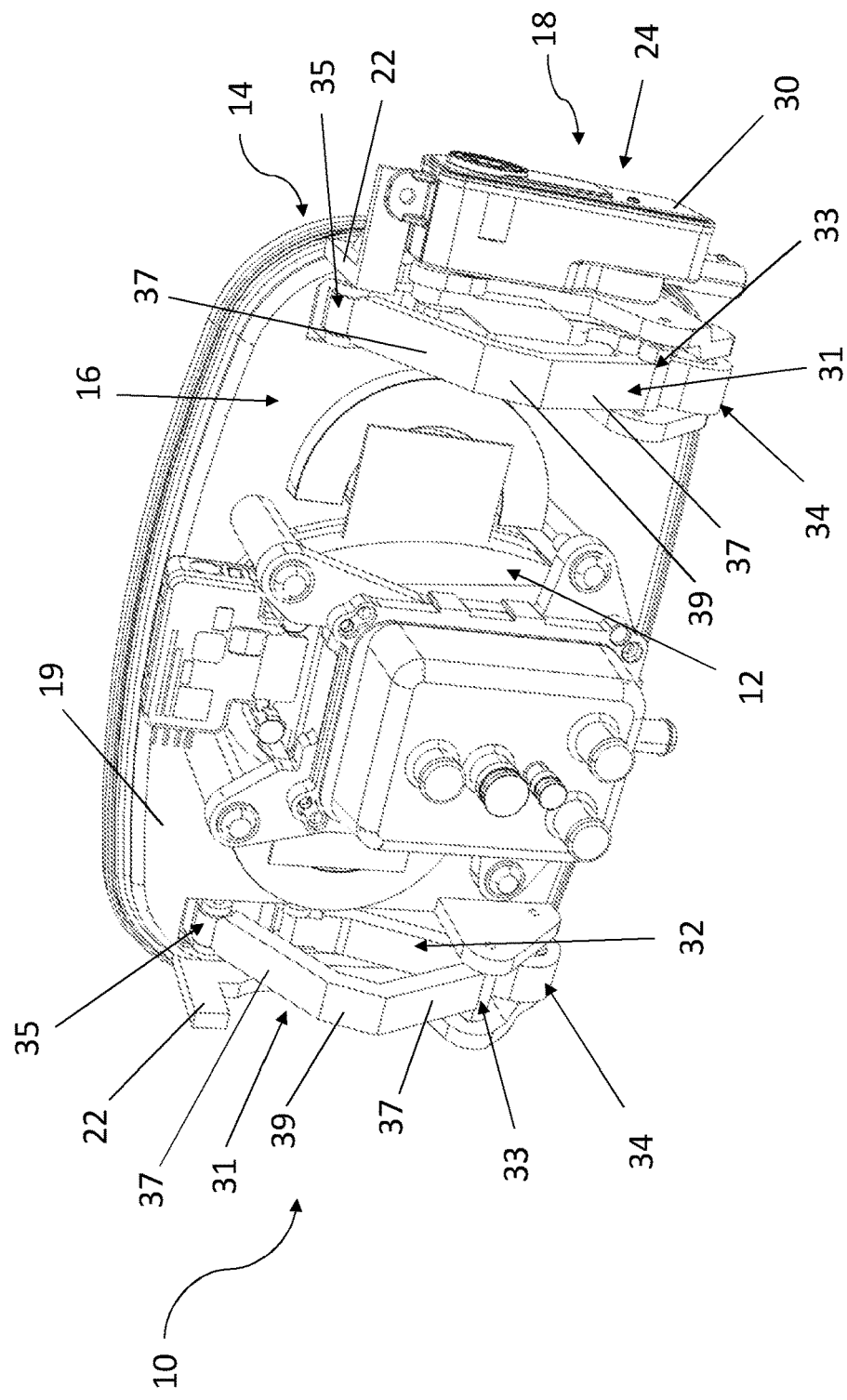
FIG. 2 is a view similar to FIG. 1 taken from another angle, the charge port flap being closed.

A vehicle door assembly 10 according a particular embodiment of the invention has been shown on FIGS. 1 and 2. The vehicle itself is not shown on the Figures, but it is preferably an electric vehicle.

The vehicle door assembly 10 is intended to be located in an opening made through a vehicle door panel (not shown), said opening also intended to receive an electric charge port 12 of the vehicle. On FIG. 1 where the electric charge port 12 can be seen, it is connected to a vehicle charge plug 13.

The vehicle charge port door assembly 10 comprises a charge port flap 14, a bracket 16 configured to be fixed to the vehicle and a motorized actuation mechanism 18.

The bracket 16 is here attached to the vehicle door panel such that it partially fills its opening. In the embodiment as shown on the Figures, the bracket 16 is delimited by an upper bracket side and a lower bracket side that are substantially parallel. Here lateral "upper" and "lower" are meant to be understood as having the motor vehicle as a reference frame, and also corresponds to the reference frame of the drawings.

More particularly, the bracket 16 comprises a main plate 19 that has a contour that is rectangular with rounded corners. The upper and lower bracket sides here correspond to the upper 19U and lower 19D plate sides, or horizontal plate sides considering the orientation of the Figures. The main plate 19 includes a central opening 20, best shown on FIG. 3, giving access to the charge port 12.

Bracket 16 also includes, on each of the lateral sides 19L of the plate (here lateral is meant to be understood as having the motor vehicle as a reference frame, and also corresponds to the reference frame of the drawings), flanges 22 that extend substantially perpendicularly from main plate 19.

Flanges 22 extend over almost the whole length of the lateral sides 19L of the main plate. As can be seen on FIG. 3, flanges 22 also support at one of their ends, here the lower ends, a couple of bearings 22B for parts of the motorized actuation mechanism 18 as will be explained below. Opposite the bearings 22B, main plate 19 also comprises ribs extending perpendicularly to the plate 19 to hold corresponding bearings 19B.

The charge port flap 14 is preferably substantially planar to facilitate its sitting flush with an outer surface of the vehicle door plane. The charge port flap 14 is delimited by an upper flap side 14U and a lower flap side 14D that are substantially parallel.

In the example shown on the Figures, the charge port flap 14 is more particularly a plate having a contour that is rectangular with rounded corners and matches the shape of bracket 16. Hence, the upper flap side 14U, lower flap side 14D are parallel to the upper 19U and lower 19D plate sides. It should be noted that this is just an example and the charge port flap 14 could have a different shape, especially should the shape of bracket 16 be different. However, the charge port flap 14 and the bracket 16 shape preferably match.

The motorized actuation mechanism 18 is configured to move the charge port flap 14 between a closed position, shown on FIGS. 2, 4, 5 and 7 and an open position, shown on FIGS. 1, 3, 6 and 8. As shown on FIG. 9, in the closed position, the charge port flap 14 closes the charge port 12 of the vehicle and sits flush with the outer surface of the vehicle door panel 100. In the open position, access is granted to the charge port 12.

The motorized actuation mechanism 18 comprises an actuator 24 fixed to the bracket 16 and comprising a rotatable output shaft 26 with an eccentric crank pin 28, which extends along a longitudinal axis and has an oblong shape.

In the example represented on the Figures, actuator 24 is contained within a housing 30 that extends along a lateral side 19L of the main plate 19. Said housing 30 is attached, for example via a protuberance screwed to a lateral extension 22L of the flanges 22, extending perpendicularly to an end of said flange 22, here an upper end. Output shaft 26 and crank pin 28 extend perpendicularly from actuator housing 30, here along the direction of the upper and lower sides of the lateral side 19L of the main plate.

Figure 3:
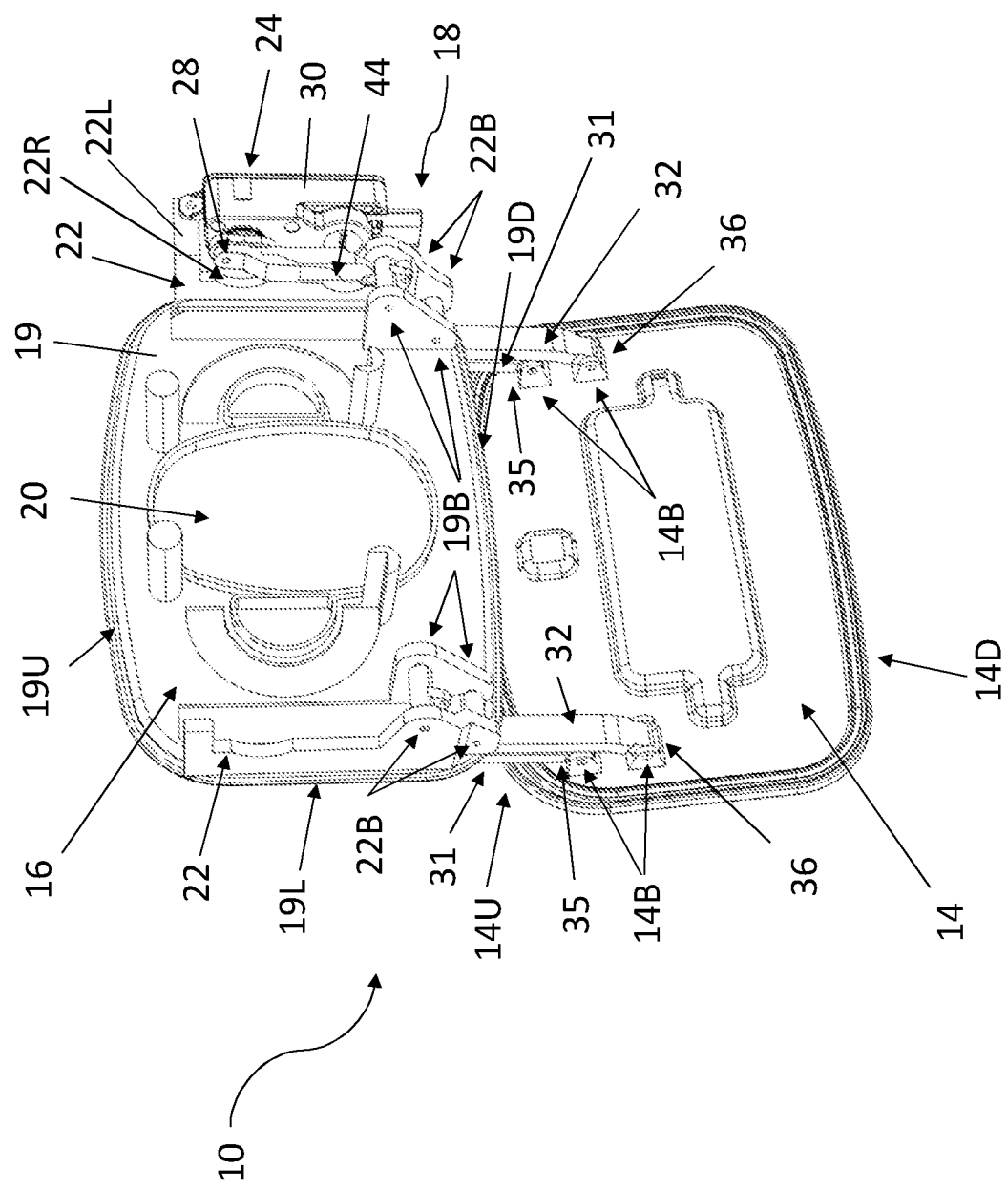
FIG. 3 is a view in perspective of a vehicle charge port door assembly according to a particular embodiment of the invention, the charge port flap being open.
Figure 4:
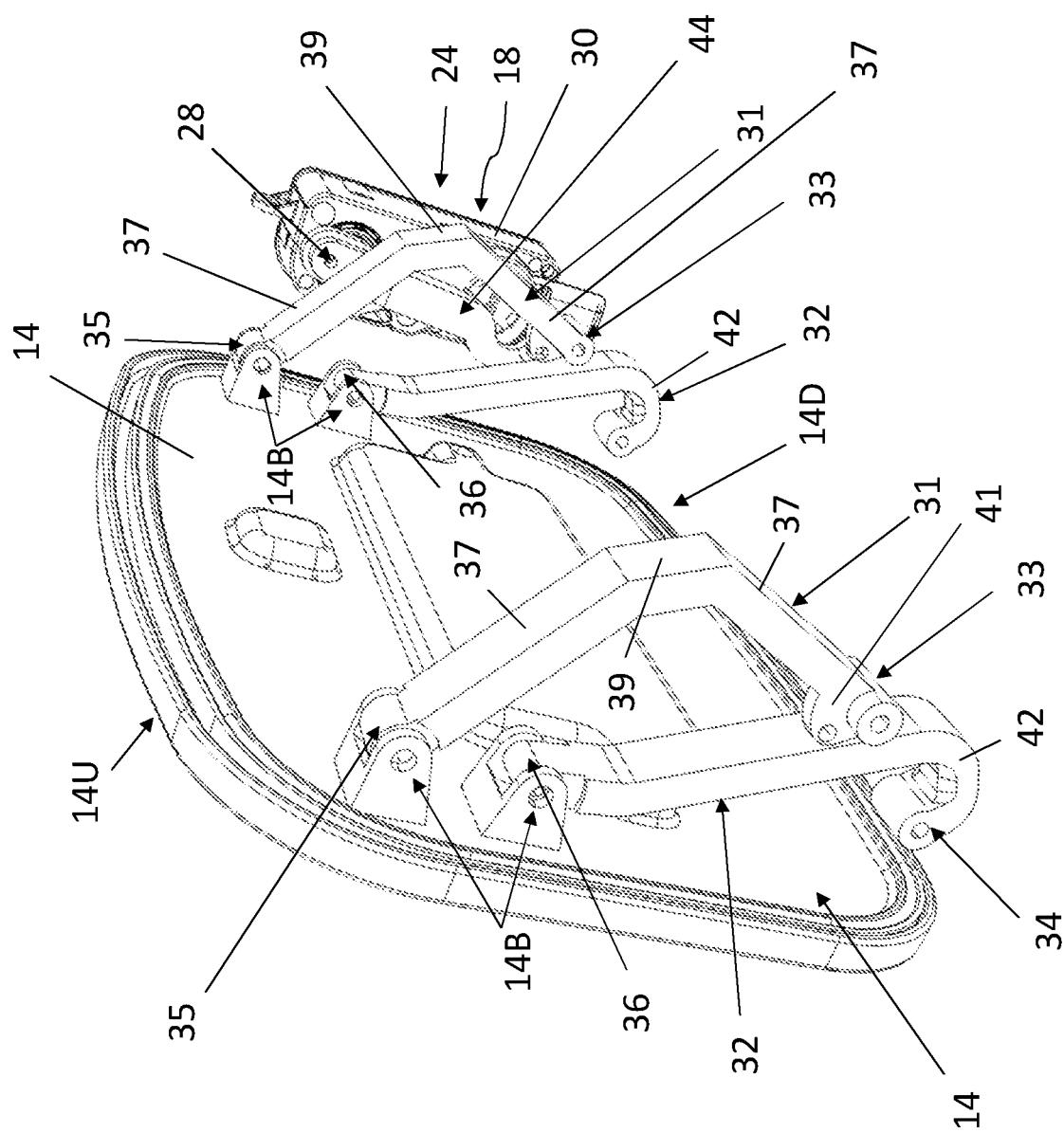
FIG. 4 is a view similar to FIG. 3, the charge port flap being closed.
Figure 5:
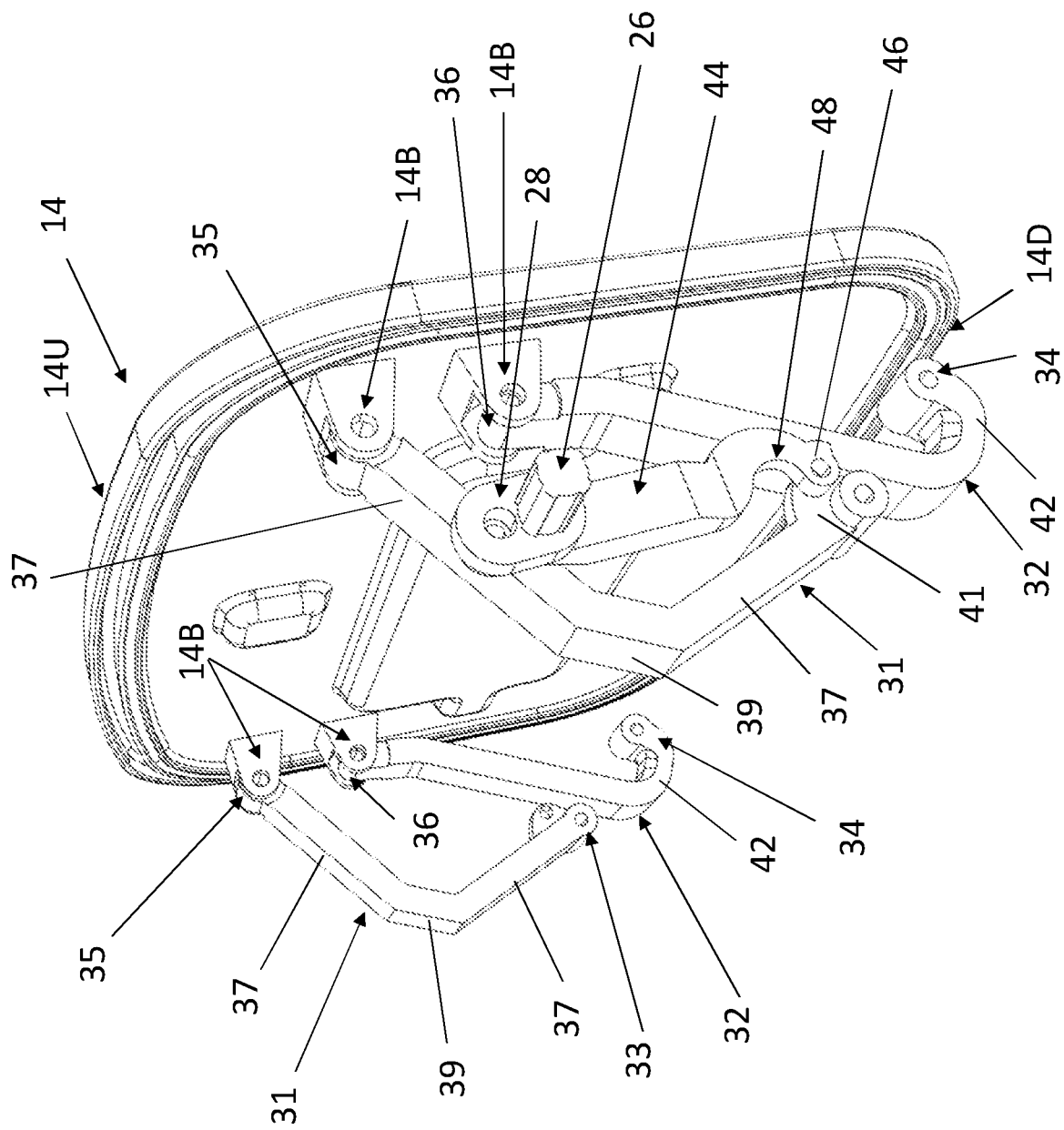
FIG. 5 is a view in perspective of the vehicle charge port door of FIG. 1 without its actuator, the charge port flap being closed.

As can be seen on FIG. 3, actuator 24 is placed such that crank pin 28 can move freely about output shaft 26 within the space created by a recess 22R made in the flange 22 to which actuator 24 is attached. Here, due to the oblong shape of crank pin 28, recess 22R is a semi-circular cut made into flange 22.

The motorized actuation mechanism 18 also comprises a lever parallelogram with a first lever 31 and a second lever 32.

Both levers 31, 32 are hinged, at one end, to the charge port flap 14. In what follows, those ends will respectively be called flap ends 35, 36. Flap ends 35, 36 are connected and hinged to the charge port flap 14 using bearings 14B stemming from the internal surface of the charge port flap (internal is here used as opposed to external, which is the face visible from the exterior of the vehicle).

Both levers 31, 32 are also hinged, at their end opposite to the flap end 35, 36 to the bracket 16 and supported by plate bearings 19B and flange bearings 22B. In what follows, those ends will respectively be called bracket ends 33, 34.

In the embodiment as shown in the Figures, there are a couple of first levers 31, and a couple of second levers 32. Each couple of first levers 31 and second levers 32 are placed next to the lateral sides 19L of the main plate and the lateral sides of the flap, respectively, for obvious symmetry and force distribution reasons.

In addition, the first lever 31 and second lever 32 are hinged, at their respective bracket ends 33, 34, to the lower bracket side 19D and, at the other end, to the upper flap side 14U. In that way, the levers 31, 32 are smaller and less space is required to fit them in the vehicle door assembly 10.

The first levers 31 comprise two perpendicular rectilinear legs 37 joined by a transverse section 39, giving to the first lever somewhat of an L shape. The space between the rectilinear legs 37 allows to make way for the second levers 32 during their movement as will be explained later.

The first levers 31 also comprise, at their ends hinged to the bracket 16, i.e. bracket ends 33, driving protrusions 41. Driving protrusions 41 here have the shape of a lobe, but any other shape may be considered. It should be noted that due to the particular role of driving protrusion 41, which will be explained later on, even though both levers 31 have a driving protrusion 41 for symmetry reasons on the Figures, only one driving protrusion 31 is actually necessary for the actuation of motorized actuation mechanism 18.

The second levers 32 are J-shaped. The curved portion 42 of the second lever, i.e. of the "J" formed of the second lever is on the side of its bracket end 34.

Figure 6:
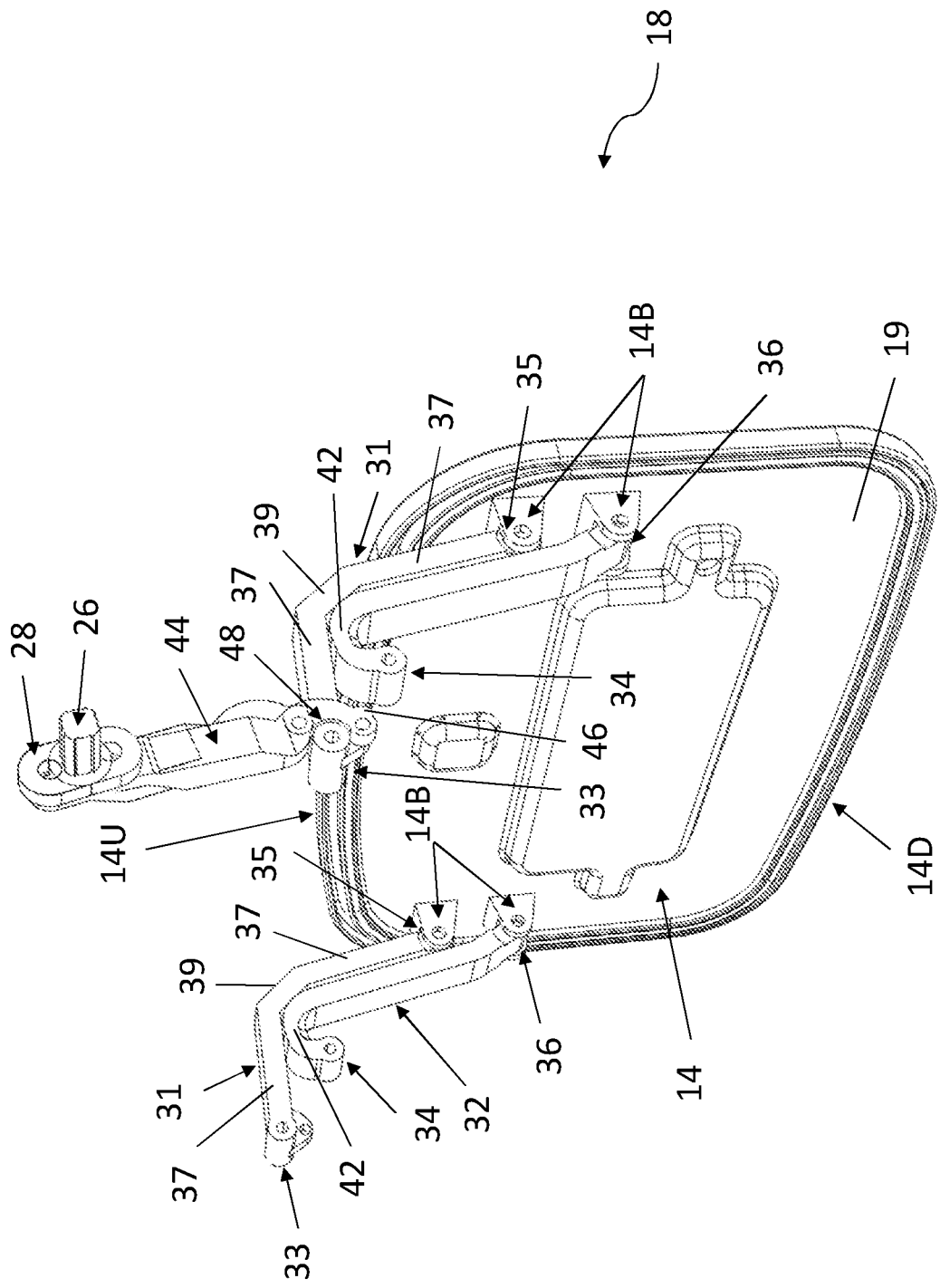
FIG. 6 is a view similar to FIG. 5, the charge port flap being open.
Figure 7:
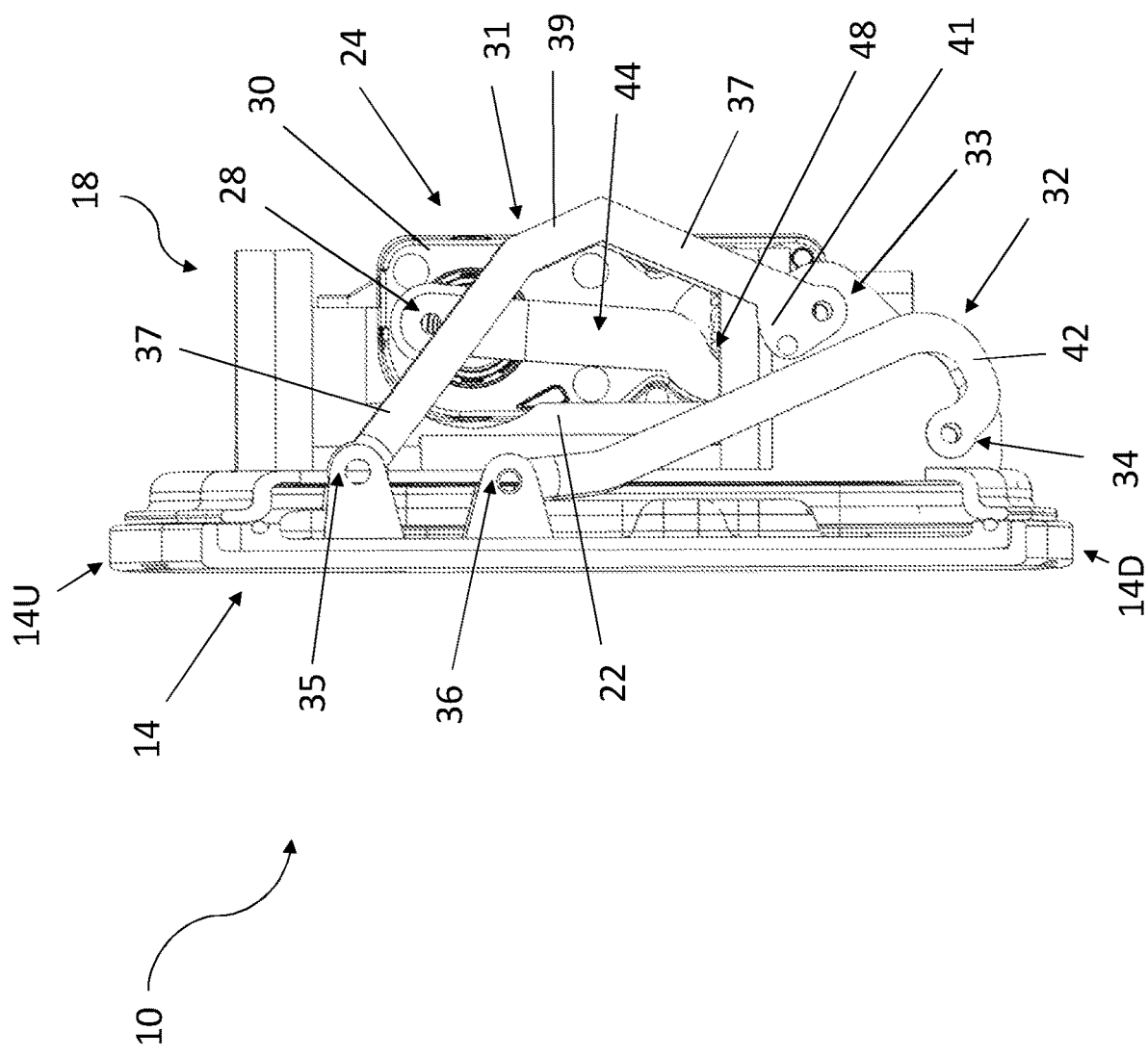
FIG. 7 is a side view of the vehicle charge port door assembly according to FIG. 1, the charge port flap being closed.

The first levers 31 and second levers 32 are configured such wherein the first levers 31 respectively rest upon the second levers 32 in the open position as can be shown on FIG. 6. To be more precise, the curved portions 42 of the second levers 32 respectively come into contact with the transverse section 39 of the first levers 31 in the open position.

To that end, the first lever 31 and second lever 32 are configured such that the curved portion 42 of the second lever matches the transverse section 39 of the first lever. More particularly, the curved portions 42 of the second levers 32 nestle in the respective spaces between the rectilinear legs 37 of the first levers 31 in the open position, as can be best seen on FIGS. 6 and 8.

Due to the resting of the first levers 31 onto the second levers 32 in the open position of the charge door flap 14, it is not possible to further open the charge door flap 14 past its predetermined open position, as the second levers 32 will prevent the first levers 31 from being further lowered.

The motorized actuation mechanism 18 also comprises a driving rod 44 connecting the crank pin 28 to the driving protrusion 41 of one of the first levers 31. In the example represented on the Figures, the driving rod 44 connects the crank pin 28 to the driving protrusion 41 of the first lever 31 that is closest to the actuator 24.

The driving rod 44 sensibly extends along a longitudinal direction. It comprises an end 46 that is connected to the driving protrusion 41 of the first lever 31 closest to the actuator. This end 46 comprises a notch 48 preferably semi-circular in shape, in order for the driving rod 44 to get around the first lever bracket end 33 (or rotation axis) during its movement as will be explained.

An eccentric movement of the crank pin 28 drives, via the lever parallelogram formed by the first lever 31 and the second lever 32 that are closest to the actuator 24, the charge port flap 14 between the closed and the open position and vice versa. It should be noted here that another lever parallelogram is also formed by the other couple of first lever 31 and second lever 32, but these are not directly driven by the driving rod 44 and follow the movement of the other couple of levers 31, 32 that is closest to the actuator 24.

In particular, movement of the crank pin 28 imparts a rotational movement of the first lever 31 about the hinge axes of first lever 31 at first lever bracket end 33.

To that end, the driving protrusion 41 of the one of the two first levers 31 and the driving rod 44 are connected by means of a driving pin (not visible on the Figures) extending parallel to the hinge axes of the levers 31, 32.

The movement sequence leading to the opening or the closing of the charge port flap 14 will now be explained in reference to FIGS. 5 to 8.

When the actuator 24 imparts a rotational movement to the output shaft 26, the crank pin 28 rotates about its own axis following an eccentric movement. For instance, when the port flap 14 is in the closed position and when looking at FIG. 5, this rotation occurs in a clockwise direction.

The eccentric movement of the crank pin 28 makes the driving rod 44 move up and down depending on the initial position of the crank pin 28. For instance, when the port flap 14 is in the closed position, the driving rod 44 moves downwards, i.e. in the direction from the upper side of the flap 14U towards the lower side of the flap 14D.

The upwards or downwards movement of the driving rod 44 makes it respectively pull push onto the driving protrusion 41 of the first lever 31, thus imparting a rotational movement of the first lever 31, which rotates about its hinge on its bracket end 33. When the port flap 14 is in the closed position and looking at FIG. 5, this rotation occurs in a clockwise direction.

Considering the connection of the first levers 31 to the port flap 14, movement of the first lever 31 then makes the port flap 14 move upwards or downwards.

Considering the orientation of the Figures and the embodiment, the port flap 14 moves downwards to move from the closed to the open position, and upwards to move from the open position to the closed position. However, it should be noted that in a possible variant, the opposite can be sought.

Due to the connection of the second lever 32 to the port flap 14 and the fact that it is hinged on said flap 14 and to the bracket 16, movement of the crank pin 28 also imparts a rotational movement of the second lever 32 about the hinge axis of second lever 32 at second lever bracket end 34. In other words, the first lever 31 is the main driving lever for the port flap 14, while the second lever 32 acts as a follower.

Figure 8:
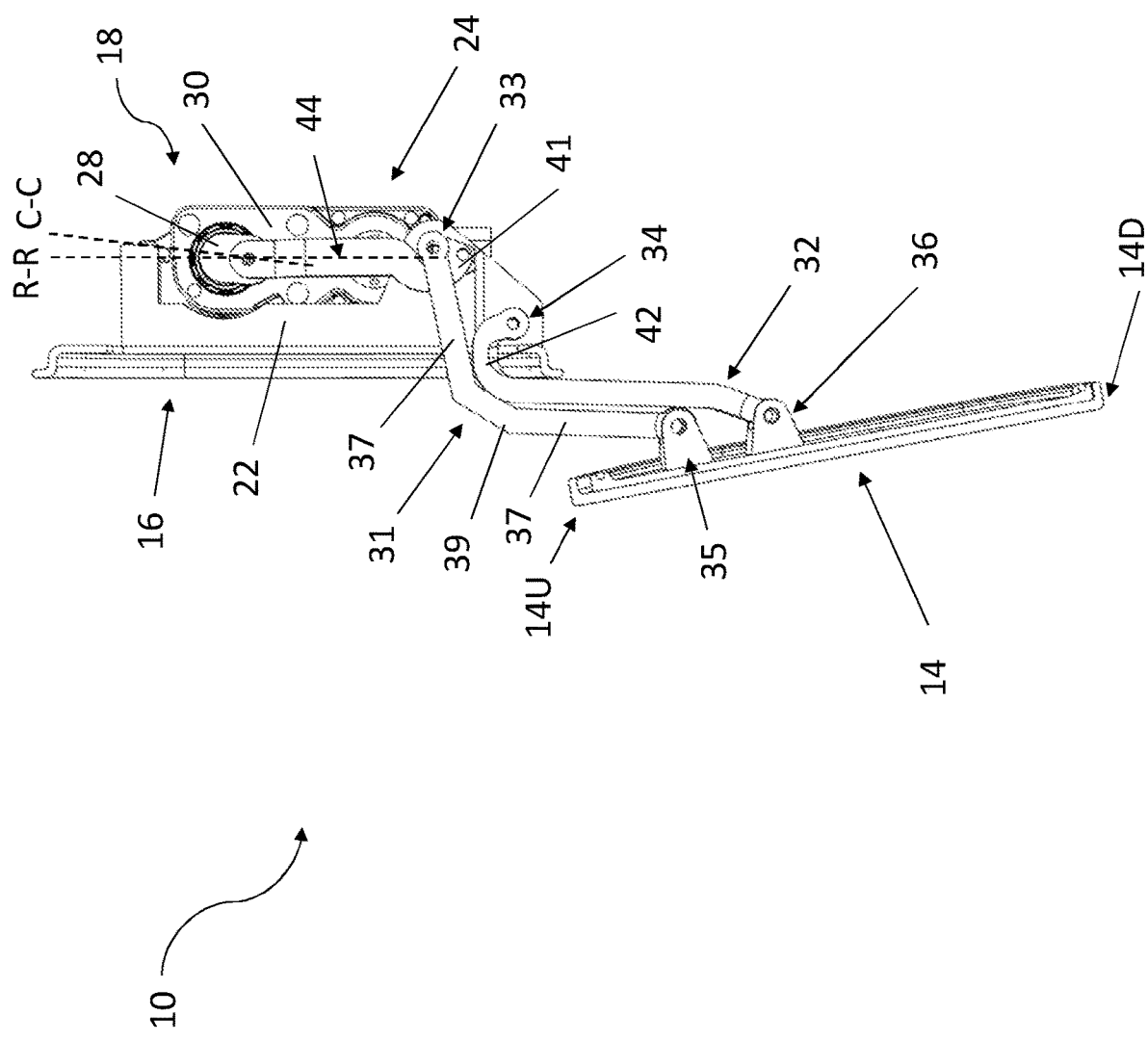
FIG. 8 is a view similar to FIG. 7, the charge port flap being open.
Figure 9:
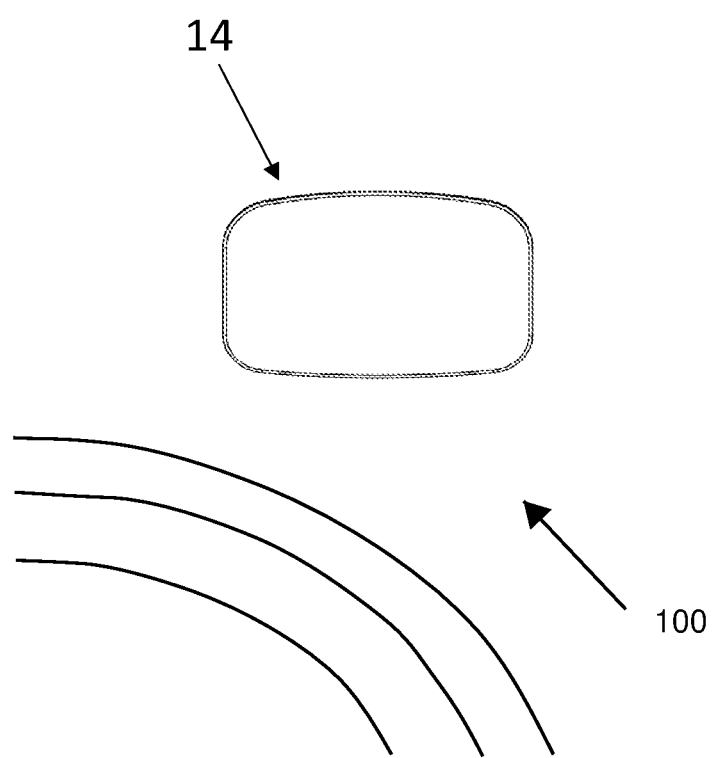
FIG. 9 is a view of a portion of an outer surface of a vehicle including a vehicle charge port door assembly.

Moreover, as can be seen on FIG. 8, in a plane that is normal to the output shaft 26, the longitudinal axis C-C along which the crank pin 28 extends forms an angle with the longitudinal axis R-R along which the driving rod 44. This angle is comprised between 1° and 3°. In the embodiment as shown on the Figures, this angle is substantially equal to 1.5°. This ensures a good sealing of the charge port flap 14 in its closed position as will now be explained in reference to FIG. 5.

Indeed, it is possible, even if the door flap 14 is already in the closed position, to keep turning the output shaft 26 (in the anticlockwise direction on FIG. 5), and thus the crank pin 28, such that it transmits to the driving rod 44 a force that drives it upwards. The driving rod 44 therefore keeps slightly pulling on the driving protrusion 41, which in turn makes the first lever 31 next to the actuator 24, and all other levers 31, 32 as explained before, slightly rotate about its bracket end 33. All levers 31, 32 hence pull onto the charge port flap 14 which is therefore kept slightly pulled against the bracket 16, thus ensuring a good sealing of the charge port flap 14 in the closed position.

In addition, the actuation mechanism 28 is configured such that the open position corresponds to an end of stroke of the output shaft 26. Thanks to this and the particular kinematic chain provided by the invention, the mechanism is self-locking in the open position, as the only way to close the charge port flap 14 is to actuate the output shaft 26 by rotating it in the direction opposite the opening rotation direction.

This will be explained in reference to FIG. 8. Taking into account the orientation of FIG. 8, an attempt to close the charge port flap 14 by actuating the charge port flap 14 in itself, and not via the output shaft 26 and crank pin 28, would result in pushing the charge port flap 14 upwards, thus rotating the levers 31, 32 in the clockwise direction about their respective bracket axes 33, 34. Said rotation would, in turn, result in pushing the driving rod 44 upwards via the driving protrusion 41 of the first lever 31 closest to actuator 24. The driving rod 44 would therefore impart an eccentric movement of the crank pin 28 by trying to make it rotate in the clockwise direction. However, such a movement is prevented as rotating the crank pin 28 as such would make the output shaft 26 be stopped as the end of stroke of the motor has been reached.

Additionally, the actuator 24 is for example configured such that rotation of the output shaft 26 is comprised between 3° and 185°.

Thus one clearly understands that thanks to the particular kinematic chain provided by the invention, the movement of the charge port flap during its opening and closing movement remains as close as possible to the skin, i.e. achieves a movement that is mostly parallel to the outer vehicle skin. Moreover, the driving rod acts as a force multiplier allowing for a more compact actuating mechanism, thanks to the lesser forces required to open and close the charge port door. Finally, the mechanism is self-locking in the open position, as the only way to close the charge port flap is to actuate the output shaft by rotating it in the direction opposite the opening rotation direction, thus preventing any unwanted manual closing.

LIST OF REFERENCES

10: Vehicle door assembly
12: Electric charge port
13: Vehicle charge plug
14: Charge Port flap
14B: Bearings of the flap
14D: Lower side of the flap
14U: Upper side of the flap
16: Bracket
18: Motorized actuation mechanism
19: Main plate of the bracket
19B: Bearings of the main plate
19D: Lower side of the flap
19L: Lateral edges of the plate
19U: Upper side of the flap
20: Central opening of the plate of the bracket
22: Flanges of the bracket
22B: Bearings of the flanges
22R: Recess of a flange
24: Actuator
26: Output shaft
28: Crank pin
30: Actuator housing
31: First lever
32: Second lever
33: Bracket end of the first lever
34: Bracket end of the second lever
35: Flap end of the first lever
36: Flap end of the second lever
37: Rectilinear legs of the first lever
39: Transverse section of the first lever
41: Driving protrusion of the first lever
42: Curved portion of the second lever
44: Driving rod
48: Notch of the crank pin

The invention claimed is:

1. A vehicle charge port door assembly, comprising:
a charge port flap;
a bracket configured to be fixed to the vehicle; and
a motorized actuation mechanism configured to move the charge port flap between a closed position and an open position, such that in the closed position, the charge port flap closes a charge port of the vehicle and sits flush with an outer surface of the vehicle and that in the open position, access is granted to the charge port,
wherein the motorized actuation mechanism comprises:
an actuator fixed to the bracket and comprising a rotatable output shaft with an eccentric crank pin,
at least one lever parallelogram with a first lever and a second lever, each lever being hinged, at one end, to the charge port flap and, at the other end, to the bracket and configured to drive the charge port flap between said open and closed position, said first lever presenting, at its end hinged to the bracket, a driving protrusion, and
a driving rod connecting said crank pin to the driving protrusion so that an eccentric movement of the crank pin drives, via the lever parallelogram, the charge port flap between the closed and the open position and vice versa,
wherein, in a plane that is normal to the output shaft, the longitudinal axis along which the crank pin extends forms an angle with the longitudinal axis along which the driving rod extends, said angle being between 1° and 3° in the closed position of the charge port flap.

2. The vehicle charge port door assembly according to claim 1, wherein said angle is 1.5°.

3. The vehicle charge port door assembly according to claim 1, wherein the actuation mechanism is configured such that the open position corresponds to an end of a stroke of the output shaft.

4. The vehicle charge port door assembly according to claim 1, wherein the actuator is configured such that rotation of the output shaft is between 3° and 185°.

5. The vehicle charge port door assembly according to claim 1, wherein the bracket is delimited by an upper bracket side and a lower bracket side that are substantially parallel, and the charge port flap is delimited by an upper flap side and a lower flap side that are substantially parallel.

6. The vehicle charge port door assembly according to claim 5, wherein the first levers and the second levers are hinged, at one end, to the lower bracket side and, at the other end, to the upper flap side.

7. The vehicle charge port door assembly according to claim 1, wherein the bracket includes an opening configured to receive the charge port of the vehicle.

8. The vehicle charge port door assembly according to claim 1, wherein an end of the driving rod connected to the driving protrusion comprises a notch in order for the driving rod to get around the first lever when it rotates.

9. The vehicle charge port door assembly according to claim 8, wherein the notch is semi-circular in shape.

10. The vehicle charge port door assembly according to claim 1, wherein the first lever comprises two perpendicular rectilinear legs joined by a transverse section such that a space between the rectilinear legs is configured to make way for the second lever when it rotates.

11. The vehicle charge port door assembly according to claim 1, wherein the first lever rests upon the second lever in the open position.

12. The vehicle charge port door assembly according to claim 11, wherein the first lever comprises two perpendicular rectilinear legs joined by a transverse section such that a space between the rectilinear legs is configured to make way for the second lever when it rotates, and
  wherein the second lever is J-shaped and a curved portion of the second lever comes into contact with the transverse section of the first lever in the open position.

* * * * *